United States Patent
Pilozzi et al.

(10) Patent No.: US 6,674,794 B1
(45) Date of Patent: Jan. 6, 2004

(54) SYSTEM AND METHOD FOR SAMPLING PHASE ADJUSTMENT BY AN ANALOG MODEM

(75) Inventors: John Pilozzi, Stow, MA (US); Dae-Young Kim, Lexington, MA (US); Jack Liu, Woodridge, IL (US); S. Arif Ahmed, Rolling Meadows, IL (US); Vladimir Parizhsky, New York, NY (US); Sepehr Mehrabanzad, Southborough, MA (US)

(73) Assignees: Motorola, Inc., Schaumburg, IL (US); 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/498,328

(22) Filed: Feb. 4, 2000

(51) Int. Cl.$^7$ .............................. H04B 1/38; H04L 5/16
(52) U.S. Cl. ...................... 375/222; 375/371; 370/516
(58) Field of Search .................... 375/219, 221, 375/222, 373, 371, 354, 358, 362; 455/69, 70; 370/507, 503, 516, 355

(56) References Cited

U.S. PATENT DOCUMENTS 5,199,046 A    3/1993   Ling
5,394,437 A    2/1995   Ayanoglu et al. ........... 375/222

OTHER PUBLICATIONS

PCT International Search Report, PCT/US01/03340 (3 pgs.).

*Primary Examiner*—Jean B. Corrielus

(57) ABSTRACT

A system and method for adjusting the phase of the analog signal produced by an analog modem connected to a digital modem over a telephone network. The digital portion of the telephone network is locked to the network clock, and the modems have no control over the sampling timing or rate as the analog signal is sampled and quantized by a codec. If the analog signal is shifted in phase relative to the network clock, then the codec may be sampling at unresolvable points on the analog signal, thereby causing errors and a decrease in the usable bandwidth for transmitting data. The analog modem symbol frequency is locked to the clock of the digital network using loop-back timing. A phase estimate is computed using the quantized samples of a known reference signal. Next, a "phase offset" is calculated by comparing the phase estimate to an optimum phase value. Then the digital modem sends the calculated phase offset information to the analog modem. The analog modem then delays its transmitted signal by the phase offset. After the phase of the analog modem's transmitter is adjusted, the analog signal reaches the codec at the phase desired by the digital modem.

5 Claims, 3 Drawing Sheets

SYSTEM AND METHOD FOR SAMPLING PHASE ADJUSTMENT BY AN ANALOG MODEM

FIELD OF THE INVENTION

This invention is directed towards transmitting data over telecommunications networks, and more specifically towards a system and method for adjusting the phase and/or symbol frequency of an analog modem's transmitter.

BACKGROUND OF THE INVENTION

Data transmission becomes more and more important as computer systems are used to support data intensive applications like the transfer of sounds, images, video and other media. Today's telecommunications network is primarily digital. For example, the public switched telephone network (PSTN) is almost entirely digital. The only analog portions of the network are the subscriber loops that run to homes from telephone central office switching systems.

When analog data are transmitted over the telecommunications network, the codec equipment at the telephone central office (CO) samples and quantizes the analog signals traveling through the analog loops at a frequency of 8 kHz. This 8 kHz sampling rate standard is utilized throughout the entire digital portion of the telecommunications network. The sampling clock of the CO codec has a fixed frequency at 8000 samples/sec set by the network.

The rate at which the analog signal is sampled (the number of samples taken per second) is important because it determines the quality of the signal that is generated when the digital signal is converted back to analog form. The Nyquist theorem states that in order to accurately reconstruct an analog signal from its digital samples, the sampling rate used must be greater than or equal to two times the maximum frequency component present in the band limited signal. For example, if the maximum frequency component present in an analog signal is 250 kHz, the signal must be sampled at a minimum of 500 kHz in order to be able to recover the signal from its samples with minimal information loss.

Because of the Nyquist limit, the sampling rate used by telephone central office switching equipment (8 kHz) imposes a maximum frequency of 4 kHz on signals that can be passed through the telecommunications network from an analog loop. A bandwidth of 4 kHz provides for acceptable quality voice transmission, without requiring higher speed sampling requirements and equipment. However, for data transmission, such as from a modem, this bandwidth limit is problematic. The maximum frequency of signals that can be transmitted successfully in the upstream direction (through the telecommunications network from an analog subscriber loop) is 4 kHz. In the upstream direction, there is no extra bandwidth available because the codec's sampling rate is locked at 8 kHz. Any signal energy that gets through the stop-band region of the 4 kHz low-pass filter is folded into the digitized signal according to a process known as "aliasing". Older modem protocols like international telecommunications union (ITU) V.90 and V.34 have very little excess bandwidth (energy outside the nominal band) in the upstream direction. V.34 supports much lower bit rates, and the trellis coded quadrature amplitude modulation (QAM) scheme it employs results in very little excess bandwidth.

In the downstream direction, this problem of the locked 8 kHz sampling rate does not exist. Because the analog to digital (A/D) converter employed by the downstream analog modem is not constrained to 8 kHz digitization, its sampling rate can be readily increased or decreased, within limits.

When rapidly transmitting data in the upstream direction using an ITU-V.92-like pulse code modulation (PCM) modem, a pre-equalizer must be employed by the analog modem transmitter to compensate for local loop channel distortion. When the sampling rate is below the Nyquist rate, the performance of a (pre)equalizer is severely affected by the fractional sampling phase offset of the received symbol stream relative to the codec clock. The effect can be large for symbol spaced equalizers operating on received analog signals with significant excess bandwidth. Because the telecommunication network sampling rate is fixed at 8 kHz, a digital modem operating on the telecommunication network employing a high-speed (wide bandwidth) PCM upstream modulation scheme falls into this category. The initial phase of the signal received at the digital modem (central office line-card codec) is determined by the random call timing of the analog modem and the loop channel. The analog modem digital-to-analog converter runs on a independent clock.

However, since the actual codec in use by the digital modem is locked to network timing and is not under the digital modem's control, it is not possible for the digital modem to adjust the sampling phase of the upstream digitizer. Therefore, throughput of data can be degraded.

Another problem occurs from the separate clock signal of the analog modem. As previously described, the digital-to-analog converter of the analog modem runs on a clock independent of that of the network. The frequency for this clock is supposed to be 8000 samples/sec. However, depending on the type of crystal used in the analog modem, the frequency maybe slightly off. Since the digital modem must lock to the network timing, even slight differences in the frequency between the analog modem's clock signal and the digital modem's clock signal will result in data loss.

While this problem has been described in terms of telephony signals with analog loops, the same problem occurs in many signal transmission systems where excess bandwidth is received, but the receiver cannot change the sampling rate and/or phase of a codec (or other type of A/D converter).

SUMMARY OF THE INVENTION

A system and method for adjusting the frequency and/or phase of the analog signal produced by an analog modem connected to a digital modem over a telephone network. The digital portion of the telephone network is locked to the network clock, and the modems have no control over the sampling timing and/or rate as the analog signal is sampled and quantized by a codec. If distortion such as phase shift occurs to the analog signal, then the codec may be sampling at "unresolvable" transition points on the analog signal, thereby causing errors and a decrease in the usable bandwidth for transmitting data. The analog modem is locked in frequency to the clock of the digital network using loopback timing. A phase estimate is computed using the quantized samples of a reference signal known to the digital modem. Next, a "phase offset" is calculated by comparing the phase estimate to an optimum phase value. Then the digital modem sends the calculated phase offset information to the analog modem. The analog modem then delays or advances its transmitted signal by the phase offset. After the phase of the analog modem's transmitter is adjusted, the analog signal reaches the codec at the phase desired by the digital modem. Alternatively, or in conjunction with the phase adjustment, the analog modem adjusts its frequency using the information learned by the timing recovery/ tracking algorithm in the downstream direction (learns the network timing). Then the analog modem's transmitter uses this timing for transmission.

According to one embodiment of the present invention, a method is provided for adjusting an analog signal produced by a transmitter and transmitted over an analog circuit, where the analog signal is received and converted to a digital signal locked to a fixed clock, and the digital signal is then received by a receiver. Steps include locking the transmitter frequency to the fixed clock, and adjusting a phase of the analog signal to align with the fixed clock, using information provided by the receiver. Adjusting the phase includes computing a phase estimate of the analog signal received, calculating a phase offset value to offset the phase of said analog signal received, and providing the phase offset value to the transmitter. The transmitter then adjusts the phase of the analog signal in accordance with the phase offset value.

The present invention includes an analog modem for transmitting data as an analog signal over an analog circuit, wherein said analog signal is received and converted to a digital signal by an A/D converter locked to a fixed clock. The digital signal is received by a digital modem. The analog modem includes a transmitter coupled to the analog circuit, the transmitter converting the data into the analog signal; a transmitter clock component, to provide a transmitter clock signal to the transmitter to allow the transmitter to convert the data into the analog signal; and a receiving component coupled to the analog circuit, the receiving component to receive information from the digital modem, the information including timing of the fixed clock. The transmitter clock component then adjusts the frequency and phase of the transmitter clock signal based on the information received by the receiving component. The transmitter clock component locks the transmitter clock signal to the fixed clock, and further adjusts the phase of the transmitter clock signal to align with the fixed clock.

An advantage of the present invention includes a lower error rate and/or an increase in the speed of data transmission during a connection by improving the performance of the pre-equalizer employed during data mode.

Another advantage of the present invention is that it allows a digital modem to direct a remote analog modem to adjust the relative phase of its transmitter.

Another advantage of the present invention is that it allows a digital modem to direct a remote analog modem to adjust the relative frequency of its transmitter.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION OF THE INVENTION

Figure 1:
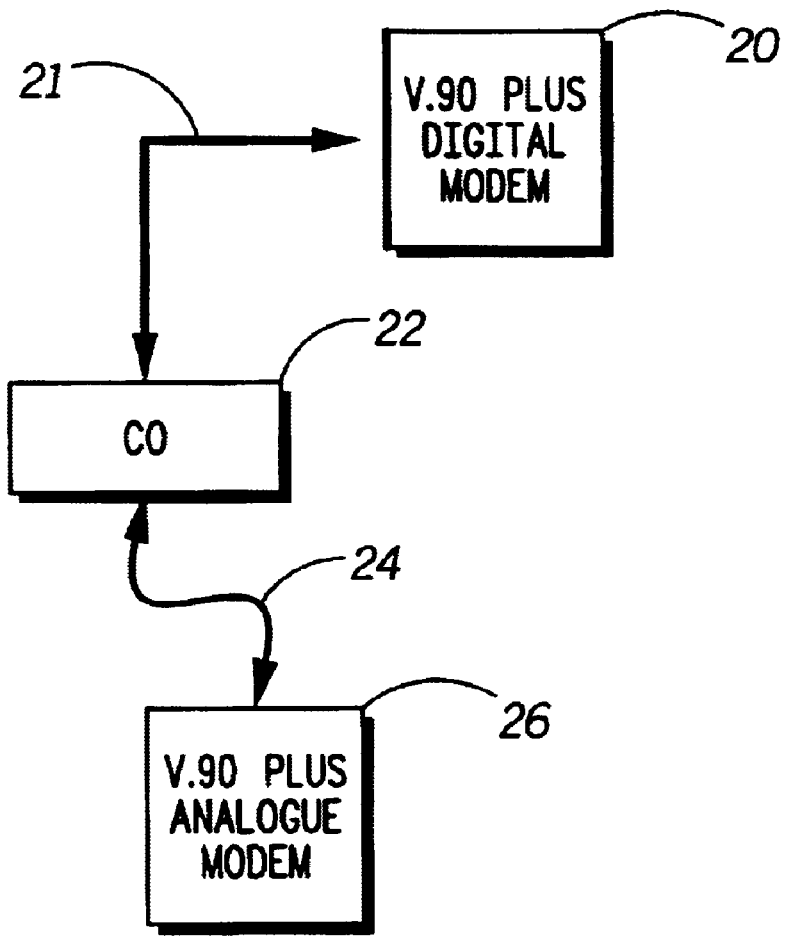
FIG. 1 is a block diagram of an example telecommunications network.

The present invention can be utilized in a telecommunications network such as the example shown in FIG. 1. A digital modem 20 is connected by a digital line 21 to a codec location, such as a telephone company central office (CO) 22. An analog subscriber loop 24 connects the CO 22 to a remotely located analog modem 26. The analog modem 26 transmits and receives analog signals over the analog loop 24 to the CO 22, where a codec converts the analog signals to and from digital PCM values. The PCM signals are carried over the digital line 21 to the location of the digital modem 20, which converts between the PCM signals and data.

The digital line 21 is typically a T1 or T3 line. However, while the digital modem 20 is shown connected to a CO 22 by a digital line 21, the digital modem may be located in the CO 22, with no need for a digital line 21 connection.

Figure 2:
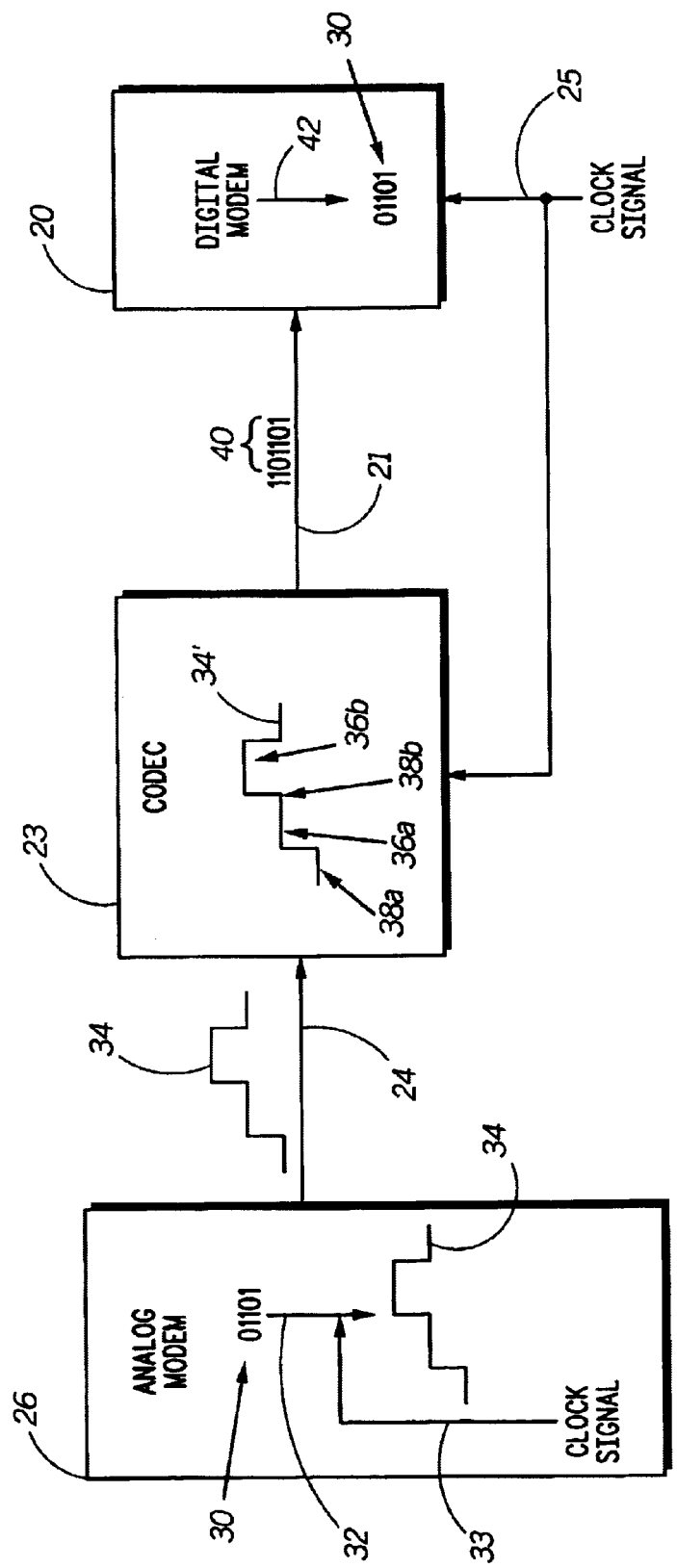
FIG. 2 is a block diagram of an upstream connection of an analog modem to a digital modem over telecommunications network of FIG. 1.

An example upstream data transmission session is shown in FIG. 2. The analog modem 26 receives information 30 to be transmitted. The analog modem 26 processes the information to produce an analog signal 34, as shown by arrow 32. Such processing includes trellis encoding and other processing such as is disclosed in co-pending patent application Ser. No. 09/390,106, filed on Sep. 3, 1999, now U.S. Pat. No. 6,594,306 and entitled "METHOD AND APPARATUS FOR A START-UP PROCEDURE FOR DIGITAL AND ANALOG MODEMS UTILIZING PULSE CODE MODULATION FOR DATA TRANSMISSION", assigned to Motorola Inc. and incorporated herein by reference. To provide the highest throughput, the analog modem preferably encodes the digital information into an analog signal 34 at the highest symbol to sample rate that the A/D converter will allow, which for the PSTN codec is 8 kHz (one symbol per sample). A clock signal 33 is provided at the appropriate frequency to the encoding system.

The analog signal 34 is transmitted over the analog loop 24 to the codec 23. When the analog signal 34' is received, the channel has distorted it according to the channel response and noise. The codec 23 samples the analog signal 34' at 8 kHz in sync with the network clock 25, and produces a digitized PCM version of the analog signal 34'. Because the sampling phase is unknown to the analog modem, the PCM samples do not accurately represent the symbols sent by the analog modem. The PCM data are encoded in a format for transmission over a digital line 21, as is well known in the art. The encoded PCM data 40 are received by the digital modem 20, which decodes the encoded PCM data 40 as shown by arrow 42, to produce the original information 30 as first received by the analog modem 30, assuming a correct sampling phase.

Without the distortion due to the unknown phase and other factors, the codec 23 would be able to sample the analog signal 34' at resolvable portions of the analog signal 34', as shown by 36a and 36b. However, shifting of the analog signal 34' in time by some amount may result in the codec 23 sampling the analog signal 34' during unresolvable portions, as shown by 38a and 38b, where the analog signal 34' is changing in magnitude. This results in unpredictable codec 23 digitization, and thereby causes errors in the encoded PCM data 40 and finally errors in the information 30 decoded by the digital modem 20.

Further, if the frequency of the clock signal 33 used for encoding 32 in the analog modem 26 is off, then distortion and data loss will occur. The frequency needs to be near exact and locked, such that any drift in frequency can be tracked.

In the downstream direction, the path and steps shown in FIG. 2 are essentially performed in reverse (not shown). The modem encoding protocol in this direction is defined by ITU Recommendation V.90. The codec 23 receives PCM data from the digital modem 20, and converts the data into an analog signal to send over the analog loop 24 to the analog modem 26. The analog modem 26 then samples the analog signal and analyzes the digital samples to produce the original information. Again, the downstream analog signal sent over the analog loop 24 is subject to distortion including phase distortion. However, in the downstream direction, the analog modem 26 is not limited to an 8 kHz sampling rate. The analog modem 26 can increase its sampling rate, and thereby reconstruct the symbols irrespective of the sampling phase, as is well known in the art. Therefore, the phase distortion caused by an analog loop 24 is not a limit to information throughput in the downstream direction. However, since neither the sampling rate nor phase of the codec 23 can be adjusted by the digital modem 20, it is a problem in the upstream direction.

This problem has been described in terms of an illustrative example with telecommunication circuits with analog and digital components. However, the problem can occur in any system where a received analog signal has excess bandwidth relative to the sampling rate of the A/D converter, and the A/D converter's sampling rate and/or phase cannot be controlled.

Figure 3:
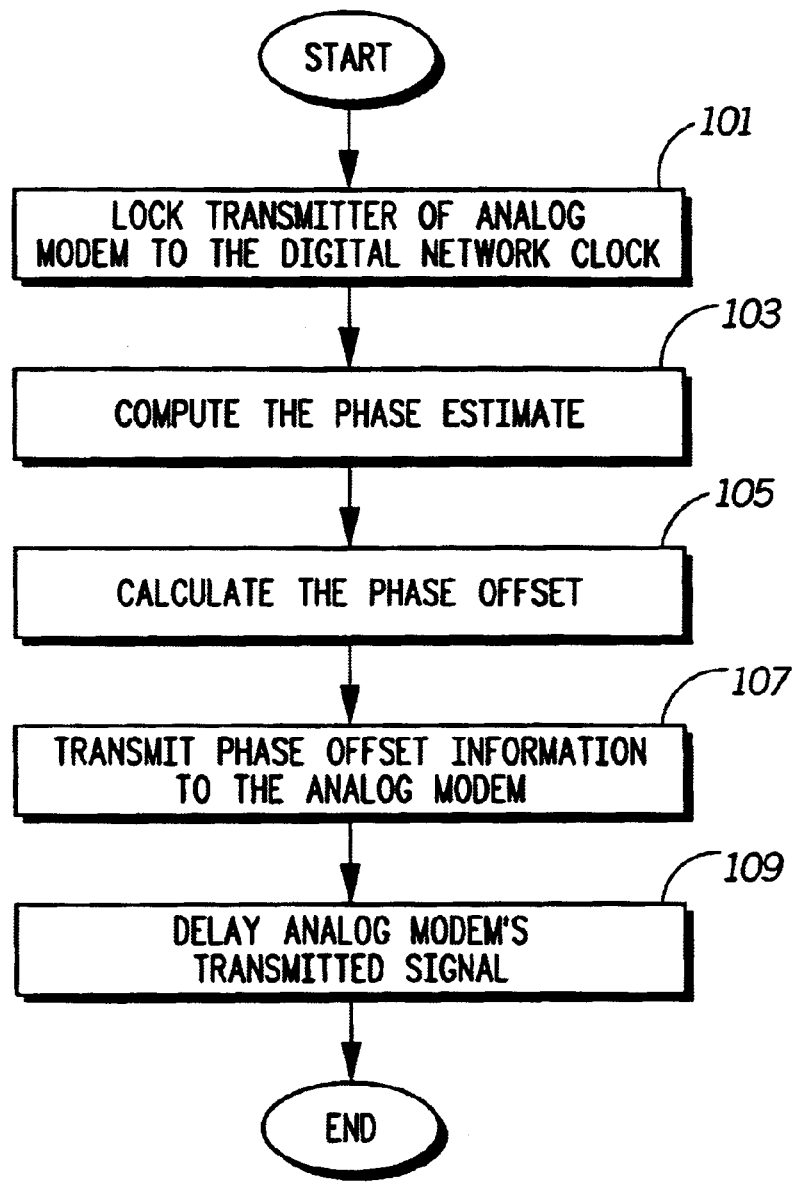
FIG. 3 illustrates the method for adjusting the phase of an analog modem's transmitter according to the present invention.

The present invention provides a method to minimize information loss by adjusting the phase and/or frequency of the analog modem's 26 transmission to ensure the highest data transmission rate possible. FIG. 3 shows a method performed by an illustrative embodiment of the present invention. Typically this method is performed by the modems 26 and 20 during the training phase. In step 101, the transmitter frequency of the analog modem 26 is locked to the digital network clock 25 using loop back timing. The analog modem 26 adjusts its frequency using the information learned by the timing recovery/tracking algorithm in the downstream direction. Suitable loop back timing methods are disclosed in U.S. Pat. No. 5,199,046 entitled "First and Second Digital Rate Converter Synchronization Device and Method" issued to Ling and assigned to Motorola, and pending U.S. Pat. application Ser. No. 09/491,768 filed on Jan. 26, 2000 entitled "Method and Apparatus for Synchronization of Digital Rate Converters to Avoid Error Accumulation" assigned to Motorola, both of which are incorporated herein by reference. Any drift in the frequency is prevented by being locked to the digital network clock 25.

In step 103, a phase estimate is computed. The phase estimate can be computed by the digital modem 20, for example as described in co-pending U.S. Pat. application Ser. No. 09/498,822 now U.S. Pat. No. 6,456,651 entitled METHOD AND APPARATUS FOR ADJUSTMENT OF THE SAMPLING PHASE IN A PCM MODEM SYSTEM USING A DUAL-PHASE PROBING SIGNAL, assigned to Motorola and incorporated herein by reference.

In step 105, the phase offset is calculated by comparing the phase estimate computed in the previous step to an optimum value. For any particular digital equalization method and modulation scheme employed, it can be determined, either through experimentation or analysis, which fractional symbol phase offset will yield the best performance. The "phase offset" can take any value, but need only take on values between [0, 1] with units of 1 symbol baud (1/8000 Hz). During a modem training period, it can be determined how much the random phase deviates from the best phase. A suitable phase estimation technique is disclosed in the above-described and incorporated Motorola patent application Ser. No. 09/498,822 now U.S. Pat. No. 6,456,651.

In step 107, the digital modem 20 encodes the phase offset information and transmits it to the analog modem 26. For example, the digital information may transmit information to the analog modem 26 telling it to adjust its phase by 0.11 symbols. The phase offset information can be transmitted along with other parameters to the analog modem 26 during training.

In an alternate embodiment, unprocessed or partially processed phase information is passed from the digital modem 20 to the analog modem 26, and is processed by the analog modem 26. This has the effect of changing the order of steps 103 and 105, and 107.

In Step 109, the analog modem delays its transmitted signal by the phase offset at a later, pre-specified point in the training sequence. The actual phase adjustment can be accomplished through a hardware adjustment of the analog modem's D/A converter or through software methods such as interpolation, etc. After the phase of the analog modem's transmitter has been adjusted, the transmitted signal 34 will arrive at the network codec 23 at the sampling times desired by the digital modem 20. If necessary, further adjustment may be performed by repeating the above steps.

The present invention lowers error rates and/or increases connect speeds during data transmission sessions by improving the performance of the pre-equalizer employed during data mode.

The present invention will improve the performance of any communication technique where the sampling rate and/or phase of the receiver A/D converter cannot be adjusted as much as desired. Performance is improved especially whenever there is excess bandwidth relative to the sampling rate of the receiver (A/D Converter rate less than or equal to twice the bandwidth of the transmitted signal).

Although the invention has been shown and described with respect to illustrative embodiments thereof, various changes, omissions and additions in the form and detail thereof may be made therein without departing from the spirit and scope of the invention.

What is claimed is:

1. A method of adjusting an analog signal produced by a transmitter and transmitted over an analog circuit, wherein said analog signal is received and converted to a digital signal locked to a fixed clock, and said digital signal is received by a receiver, said method comprising:

locking a frequency of said transmitter to said fixed clock; and adjusting a phase of said analog signal to align with said fixed clock using information provided by said receiver, wherein said step of adjusting comprises:

computing a phase estimate of said analog signal received;

calculating a phase offset value to offset said phase of said analog signal received; and providing said phase offset value to said transmitter wherein said transmitter adjusts the phase of said analog signal in accordance with said phase offset value.

2. The method of claim 1, wherein said step of computing a phase estimate of said analog signal received is performed using quantized samples of a known reference signal transmitted by said transmitter.

3. An analog modem for transmitting an analog signal produced by a transmitter and transmitted over an analog circuit, wherein said analog signal is received and converted to a digital signal locked to a fixed clock, and said digital signal is received by a receiver, said analog modem comprising:

means for locking a frequency of said transmitter to said fixed clock; and means for adjusting a phase of said analog signal to align with said fixed clock using information provided by said receiver, wherein said means for adjusting comprises:

means for computing a phase estimate of said analog signal received;

means for calculating a phase offset value to offset said phase of said analog signal received; and means for providing said phase offset value to said transmitter wherein said transmitter adjusts the phase of said analog signal in accordance with said phase offset value.

4. An analog modem as in claim 3, wherein said means for computing uses quantized samples of a known reference signal transmitted by said transmitter for computing the phase estimate of said analog signal received.

5. An analog modem as in claim 3, wherein said receiver is a digital modem.

\* \* \* \* \*